United States Patent
Wigdahl et al.

(10) Patent No.: US 6,321,516 B1
(45) Date of Patent: Nov. 27, 2001

(54) COTTON CONVEYING DUCT

(75) Inventors: Jeffrey Scott Wigdahl, Ames; Kevin Jacob Goering, Cambridge, both of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/532,578

(22) Filed: Mar. 22, 2000

(51) Int. Cl.[7] .................................................. A01D 46/08
(52) U.S. Cl. ......................................................... 56/30
(58) Field of Search ............................... 56/28, 30, 13.2, 56/13.3, 31, 32, 40, 41; 460/115, 119, 143, 23; 285/363, 364; 403/338

(56) References Cited

U.S. PATENT DOCUMENTS

| | | |
|---|---|---|
| 4,579,375 * | 4/1986 | Fischer et al. ........................ 285/363 |
| 4,606,177 | 8/1986 | Schlueter ................................. 56/30 |
| 5,394,679 | 3/1995 | Schlueter ................................. 56/30 |
| 5,857,908 * | 1/1999 | Snyder et al. ........................ 460/115 |
| 6,205,756 * | 3/2001 | Orsborn et al. ........................... 56/30 |

* cited by examiner

*Primary Examiner*—Robert E. Pezzuto

(57) ABSTRACT

A conveying duct for a cotton harvester includes forward and rear panels having generally continuously curved S-shaped configurations and fore-and-aft extending sides. The panels are joined to the sides by Pittsburgh lock joints without spot welds or separate connecting hardware. The width gradually increases and the fore-and-aft dimension decreases approximately proportionately in the upward direction so the cross sectional area remains generally constant along the length of the duct. The curved configuration lends strength and bend resistance to the duct to eliminate fatigue caused by flexing and facilitates use of thinner stock material for fabrication. The configuration also assures excellent distribution of material within the duct and across separation grates without need for vanes or baffles.

21 Claims, 3 Drawing Sheets

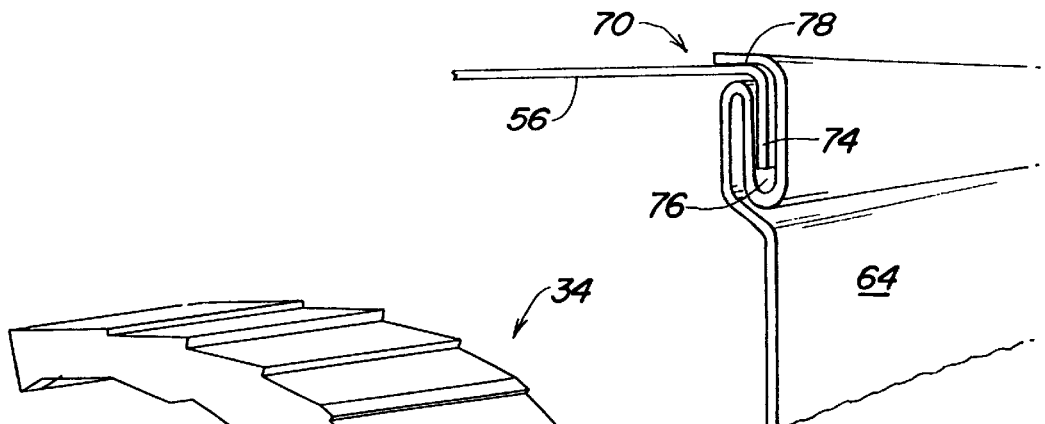
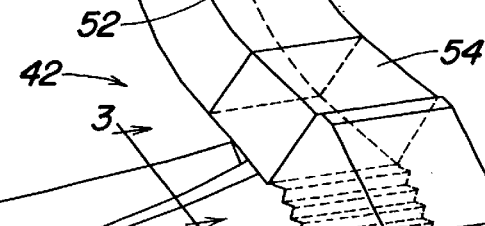
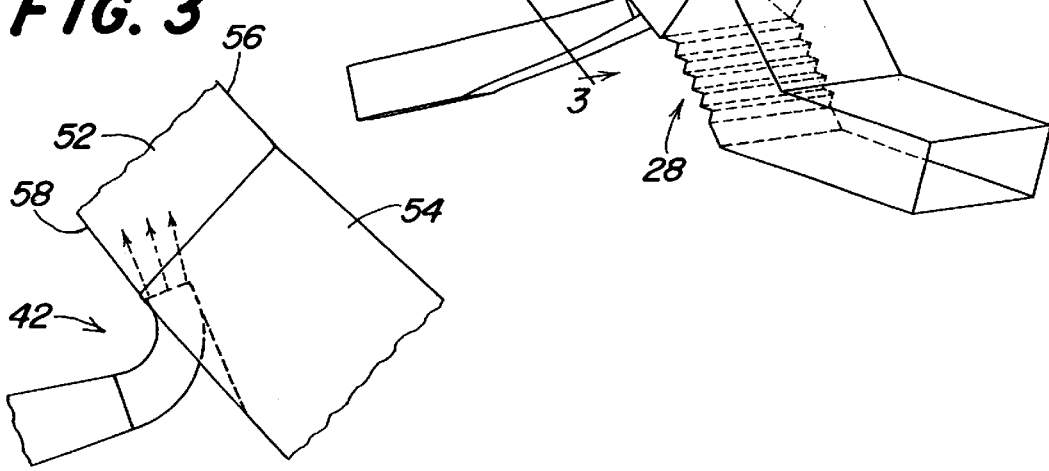

COTTON CONVEYING DUCT

BACKGROUND OF THE INVENTION

1) Field of the Invention

The present invention relates generally to crop conveying ducts for harvesters, and, more specifically, to a conveying duct for a cotton harvester.

2) Related Art

Cotton harvesters such as the John Deere Model 7455 Cotton Stripper include a large central duct for conveying cotton upwardly and rearwardly from the stripping units toward a cleaning grate adjacent a cotton cleaner and a basket on the harvester. Several problems exist with the previously available ducts. The ducts, which are fabricated from relatively heavy sheet metal and require welding, are expensive to manufacture. Large flat surfaces on the duct are very prone to flexing or "oil canning" motion caused by turbulent air flow within the duct. The motion results in fatigue, particularly at joints which are spot-welded, and decreases duct reliability. To reduce such motion, additional structure is provided on a portion of the duct, increasing cost and weight.

The trajectory of the cotton is influenced by the duct configuration, and present duct configurations fail to provide good air flow and evenly distributed cotton flow across the width of the duct, thereby decreasing conveying, separation grate and cleaner efficiency. The cotton tends to concentrate in the central portion of the duct so that the effective cleaning area of the separation grates is reduced. The central concentration also results in bunching of material on the grate assembly eventually leading to plugging, usually when there is low air speed on one side of the assembly. On some grate assemblies, plates are provided at the sides of the grates in the areas where there are relative dead spaces. To distribute the centrally concentrated material across the width of the cleaner, vanes are added to the cleaner inlet area.

BRIEF SUMMARY OF THE INVENTION

It is therefore an object of the present invention to provide an improved conveying duct for a harvester. It is a further object to provide such an improved duct which eliminates most or all of the aforementioned problems.

It is a further object of the present invention to provide an improved conveying duct for a cotton harvester which is stronger yet lighter and less expensive to manufacture than at least most previously available ducts. It is a further object to provide such a duct which is more reliable than most previously available ducts.

It is still another object of the present invention to provide an improved duct for a cotton harvester which reduces or eliminates fatigue failures caused by flexing or oil-canning effects without need for separate stiffeners or the like which increase the cost and weight of the duct. It is another object to provide such a duct which obviates welds, reduces assembly time, and requires a minimum of additional hardware.

It is yet another object to provide such a cotton conveying duct with improved air and cotton distribution characteristics. It is a further object to provide such a duct which distributes the cotton more evenly across the duct width than most previously available ducts. It is still another object to provide such a duct which eliminates dead spaces so special side plates on the grate assembly are unnecessary and which distributes cotton more uniformly across the width of the duct to obviate vanes in the cleaner input duct. It is another object to provide such a duct which distributes cotton in the duct for better flow adjacent the separation grates so more trash is removed and plugging is minimized.

A cotton conveying duct constructed in accordance with the teachings of the present invention includes a generally continuously curved panel configuration providing both strength and excellent material distribution characteristics. The duct, as viewed from a side of the harvester, has a gentle S-shape which encourages the material to move towards the front side of the duct in the upward direction for a better upper duct flow pattern and more efficient separation grate action. Distribution across the width of the cleaner is also enhanced, and special vanes or the like for spreading the flow of material are eliminated. The cross sectional area of the duct is maintained generally constant as the depth decreases in the upward direction, with a slight increase in area from bottom to top.

The curved configuration provides stiffness and strength and eliminates the weight and cost of special stiffeners. Oil canning is eliminated. Use of a Pittsburgh lock joint construction eliminates welding and weld fatigue cracking and speeds assembly. The cost to manufacture the improved duct is only a fraction of that of conventional ducts, and duct weight is reduced. The increased strength of the new construction also permits use of thinner gauge stock material having a thickness substantially less than 0.060 inches (0.15 cm.), further reducing cost and weight.

These and other objects, features and advantages of the present invention will become apparent to one skilled in the art upon reading the following detailed description in view of the drawings.

BRIEF DESCRIPTION OF THE DRAWINGS

FIG. 2 is a side perspective view of a portion of the duct structure of the harvester of FIG. 1 attached adjacent the separation grate structure.

FIG. 3 is a perspective view taken generally along lines 3—3 of FIG. 2 of the air jet nozzle.

FIG. 4 is a view taken along lines 4—4 of FIG. 3 and showing the joint construction for the duct.

DETAILED DESCRIPTION OF THE DRAWINGS

Figure 1:
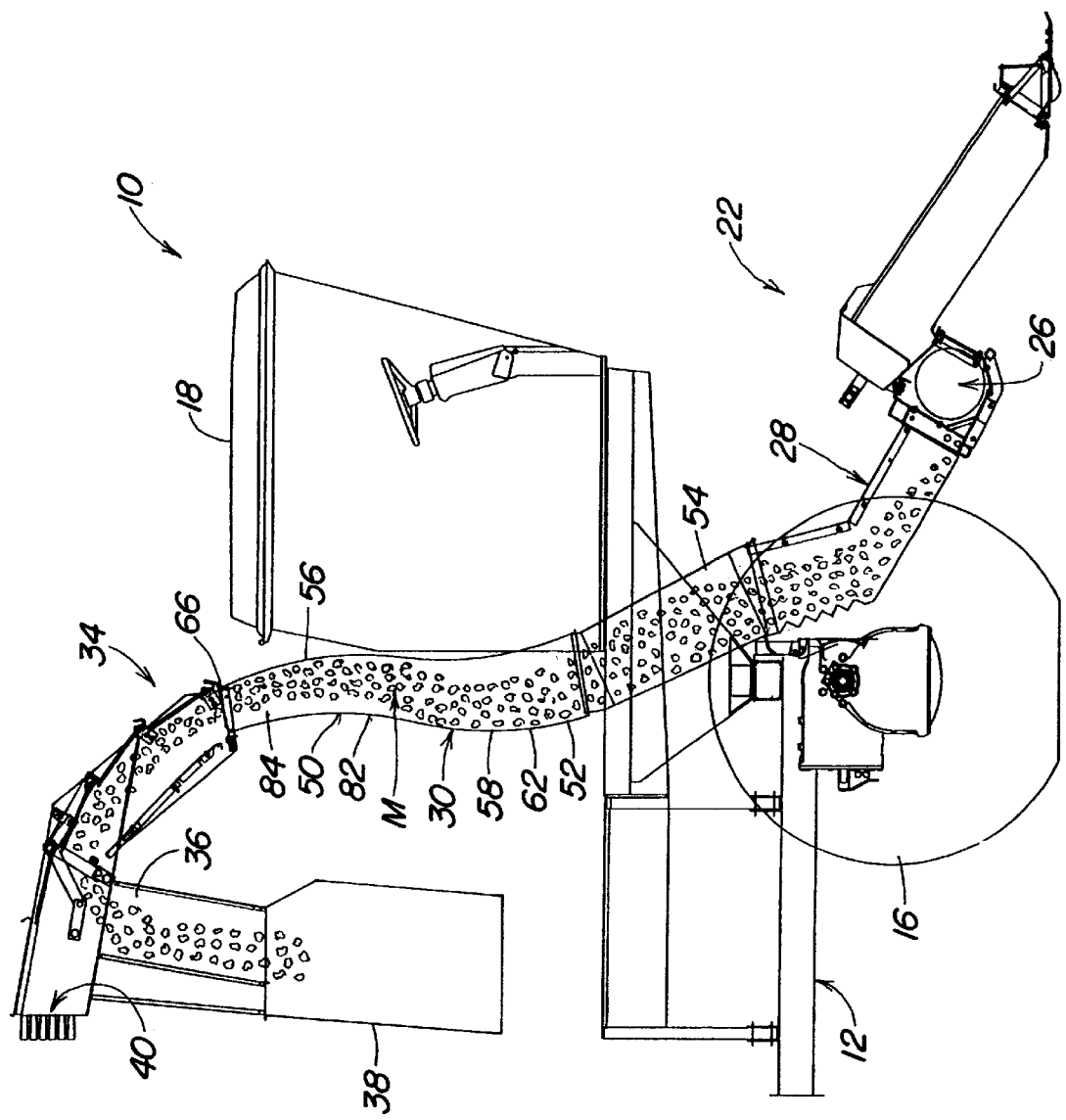
FIG. 1 is a side view of a portion of a cotton harvester, partially in section, with the improved duct structure of the present invention attached.

Referring now to FIG. 1, therein is shown a cotton harvester 10 having a main frame 12 supported for forward movement over the ground by forward drive wheels 16 and rear steerable wheels (not shown). A cab 18 is supported on the forward end of the frame 12. A lift frame is adjustably supported from the forward end of the frame 12 for mounting a conventional header 22 for stripping cotton material from rows of cotton plants. The header 22 includes a cross auger 26 for conveying stripped cotton and other material to a central outlet location which opens rearwardly into a separation duct 28.

Air duct structure 30 with an S-shaped configuration curves upwardly and rearwardly from the separation duct 28 to an upper separation grate area structure 34 which selectively directs conveyed material downwardly through a cleaner input duct 36 to an on-board cotton cleaner 38 as shown in FIG. 1, or rearwardly to a basket or receptacle through an outlet area 40. The grate area 34 is supported from the frame via duct 36 and cleaner 38 and provides principle support for the duct structure 30. A jet nozzle structure 42 (FIGS. 2 and 3) in the rear of the duct structure directs air upwardly into the duct structure 30. Induced air flow below the nozzle structure 42 directs cotton and other light material rearwardly and upwardly through the separation duct 28 and the air duct structure 30 towards the grate area structure 34. Heavy materials such as green bolls drop from the stream of conveyed material through openings near the bottom of the separation duct 28 and below the grate area structure 34, while light trash exits through the grate area 34. If further details of the grate area and separation duct are desired, reference may be had to commonly assigned U.S. Pat. Nos. 4,606,177 and 5,394,679.

Figures 5, 6:
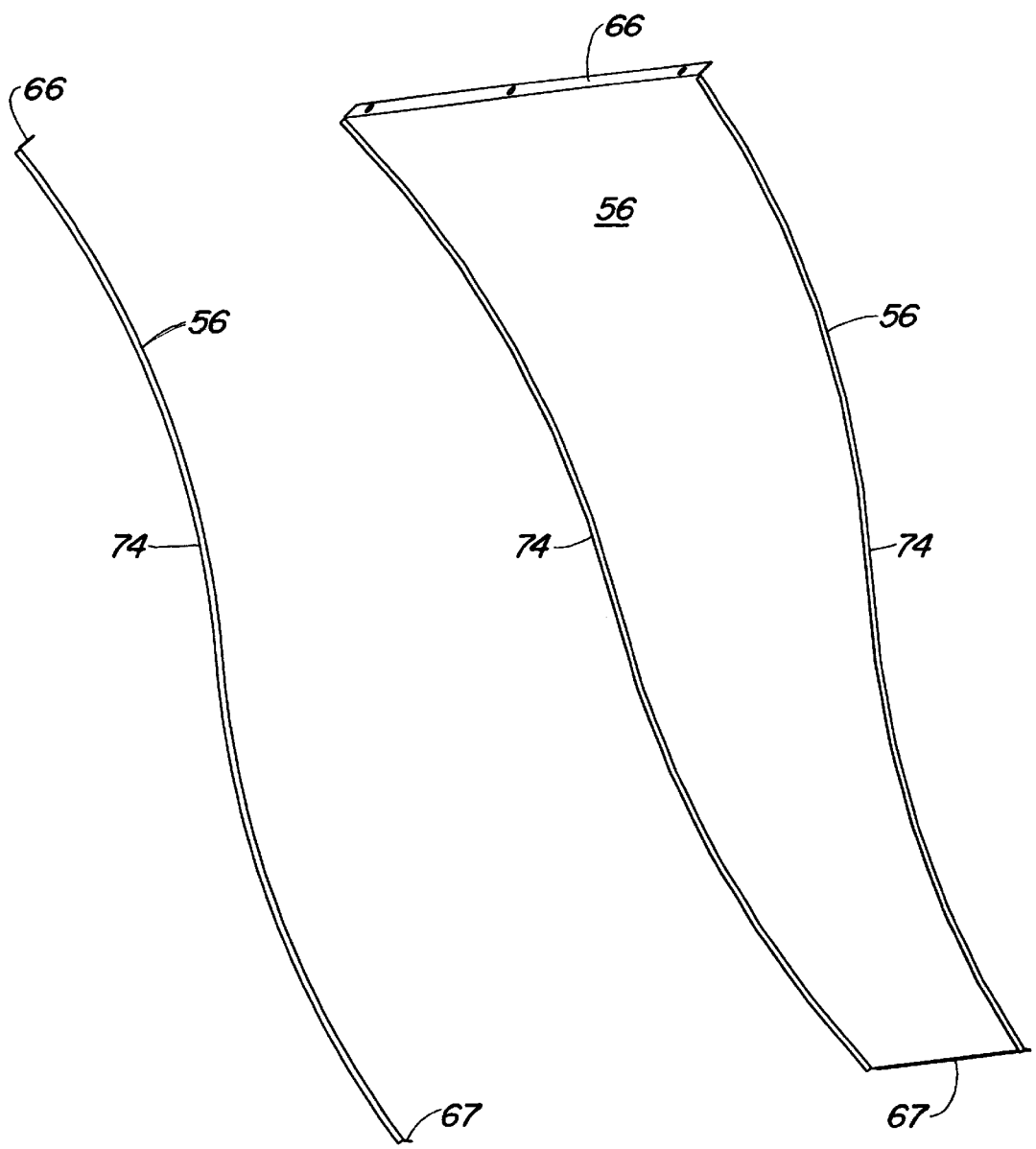
FIG. 5 is a bottom perspective view of the front panel of the duct.
FIG. 6 is a side view of the front panel of FIG. 5 showing the S-shaped configuration.

The duct structure 30 includes a main body or duct 50 having a lower end 52 of generally rectangular cross section slidably received over a mating connecting section 54 extending upwardly and rearwardly from the separation duct 28. The duct 50 includes front and rear panels 56 and 58, respectively, joined by outwardly facing sides 62 and 64. The front panel 56 includes an apertured upper connecting flange 66 connected by bolts to the grate area structure 34, and a lower leg 67. Preferably, the panels 56 and 58 are connected to the sides 62 and 64 by a Pittsburgh lock type of joint indicated generally at 70 of FIG. 4. As shown in FIG. 4, the panel 64 includes flanges 74 received within channels 76 formed in the side panels. A tool is then used to form an edge 78 over the edge of the panel 56 to lock the panels and sides together. A solid joint without spot welds or attaching hardware is therefore formed quickly and inexpensively. The front and rear panels 56 and 58 are generally identical with the exception of the flange 66 and the leg 67 on the ends of the panels which, on the rear panel 58, are bent in directions opposite those shown for the panel 56 in FIGS. 5 and 6.

The panels 56 and 58 have a gentle, continuously curved S-shaped configuration as viewed from the side (FIGS. 1 and 6) which provides stiffness and strength to the duct 30 without need for special stiffeners or the like. The lower end 52 of the duct 30 extends rearwardly and upwardly to a central portion 82 extending more steeply than the lower end 52. The duct 30 curves rearwardly at an upper end 84 from the central portion 82 to direct conveyed material into the grate area 34. The curved configuration and the joint construction lend strength, stiffness and longevity to the duct 30 and facilitate use of stock material having a thickness substantially less than that of the material commonly used in conventional ducts, which is typically on the order of 0.060 inches (0.15 cm.). Material of thickness on the order of 0.048 inches (0.12 cm.) can be used to decrease cost and weight.

The width of the duct 30 gradually increases from the lower end 52 to the upper end 84 while the depth or fore-and-aft dimension correspondingly decreases to provide a nearly constant cross sectional area the length of the duct. In the preferred embodiment, the width approximately doubles from the bottom to the top while the depth is approximately halved, although the width may be increased as much as three times from bottom to top. As shown, the duct cross section increases slightly from the bottom to the top of the duct 30. The cross section preferably remains generally rectangular the length of the duct 30, and the increase in width and the curvature of the panels 56 and 58 are gradual and generally continuous. Near the upper end 84, the width of the duct 30 is approximately equal to but slightly less than the width of the grate area 34 since the cotton spreads as it leaves the duct. The grates tend to straighten the flow of the cotton as the cotton contacts the grates. As illustrated in FIG. 1, the configuration of the duct 30 causes the conveyed material (M) to first follow the rear panel 58 near the lower end 52 and then move toward the front panel 56 in the central portion. In the upper end 84, the material is spread uniformly across the front panel 56 to take advantage of the entire grate area structure 34 and to feed the material uniformly across the width of the cleaner input duct 36.

Having described the preferred embodiment, it will become apparent that various modifications can be made without departing from the scope of the invention as defined in the accompanying claims. For example, although the duct construction is described for a central duct of a cotton stripper, the construction may also be utilized in cotton picker ducts and the like.

What is claimed is:

1. In a cotton harvester adapted for movement over a field of cotton plants in a forward direction and having harvesting structure for removing material from cotton plants, a conveying system for moving the removed material to an outlet member, and a duct for moving the removed material upwardly and rearwardly from the outlet member toward a cotton receiving structure, the duct comprising:

a main body having front and rear panels connected by fore-and-aft extending sides, the front and rear panels having an S-shaped configuration as viewed from a direction transverse to the forward direction, the panels being curved in the S-shaped configuration to lend strength to the duct and to spread the conveyed material uniformly within the duct; and wherein the main body has a width which increases in the upward direction so that the width of an upper end of the main body is at least approximately twice the width of a lower end of the main body, the main body having a fore-and-aft dimension between the front and rear panels which decreases in the upward direction generally proportionally to the increase in width in the upward direction so that cross sectional area of the main body stays approximately the same in the upward direction.

2. The duct as set forth in claim 1 including an air nozzle supported in a lower portion of the rear panel and directing air upwardly into the duct, the directed air causing the material in the duct to move adjacent the rear panel near a lower portion of the S-shaped configuration and adjacent the forward panel near a transition area between the lower portion and an upper portion of the S-shaped configuration.

3. The duct as set forth in claim 1 wherein the panels are connected to the sides by non-welded joints.

4. The duct as set forth in claim 3 wherein the joints comprise Pittsburgh lock type joints.

5. The duct as set forth in claim 1 wherein the front panel includes an uppermost connecting structure supporting the duct from the cotton receiving structure.

6. The duct as set forth in claim 5 wherein the duct includes a lower portion slidably received by the outlet member.

7. The duct as set forth in claim 1 wherein the panels are fabricated from metal having a thickness substantially less than 0.060 inch.

8. The duct as set forth in claim 1 wherein the cotton receiving structure comprises a grate having a preselected width approximately equal to but slightly less than the width of an uppermost portion of the duct, wherein the duct has a lowermost portion of width approximately one-half to one-third the preselected width.

9. In a cotton harvester adapted for movement over a field of cotton plants in a forward direction and having harvesting structure for removing material from cotton plants, a conveying system for moving the removed material to a centrally located outlet member, a cab located above the outlet member, and a duct for moving the removed material upwardly and rearwardly from the outlet member toward a cotton receiving structure, the duct comprising:

a lower section extending upwardly under the cab from the outlet member;

a main body having upright front and rear transversely extending panels connected by sides, the front and rear panels having a gently continuously curved S-shaped configuration as viewed from a direction transverse to the forward direction, the panels curved in the S-shaped configuration to lend strength to the duct, and wherein the main body is S-shaped as viewed from a direction transverse to the forward direction and includes a lower portion extending rearwardly and upwardly from the lower section, a central portion extending more steeply upwardly than the lower portion and located adjacent a back side of the cab, and an upper portion directed rearwardly and upwardly from the central portion to spread the conveyed material uniformly within the duct; and wherein the panels are transverse to the forward direction and the sides are parallel to the forward direction to define a rectangular cross section, and the panels have widths which increase in the upward direction, and the sides decrease in fore-and-aft dimension in the upward direction to maintain a generally constant cross sectional area.

10. The duct as set forth in claim 9 wherein the width of the duct increases from the lower portion to the central portion and from the central portion to the upper portion, and wherein the width of the upper portion is in a range of approximately two to three times the width of the lower portion.

11. The duct as set forth in claim 10 wherein the lower portion has a cross sectional area approximately equal to the cross sectional area of the upper portion.

12. The duct as set forth in claim 11 wherein the width increases in the upward direction.

13. The duct as set forth in claim 12 wherein the duct has a generally rectangular cross section.

14. The duct as set forth in claim 9 wherein the main body is fabricated from sheet metal and the sides and panels have non-welded connections.

15. The duct as set forth in claim 14 wherein the connections comprise Pittsburgh lock joints.

16. The duct as set forth in claim 9 wherein the upper portion includes connecting structure providing primary support for the duct on the harvester.

17. The duct as set forth in claim 9 wherein the central portion of the main body located adjacent the cab is generally vertical.

18. In a harvester adapted for movement over a field of plants in a forward direction and having harvesting structure for removing material from the plants, a duct for moving the removed material upwardly and rearwardly toward a receiving structure, the duct comprising:

a main body having upright front and rear transversely extending panels connected by sides, the front and rear panels having a continuously curved configuration to lend strength to the duct, and wherein the duct includes a lower portion extending rearwardly and upwardly, a central portion extending more steeply upwardly than the lower portion, and an upper portion directed rearwardly and upwardly from the central portion;

an air nozzle supported adjacent the lower portion and directing air upwardly into the main body to convey the material along the panels, the curved configuration causing the conveyed material to first follow one of the panels near the lower portion and the other of the panels near the upper portion; and wherein the width of the duct increases from the lower portion to the central portion and from the central portion to the upper portion, and wherein cross sectional area of the duct remains generally constant from the lower portion to the upper portion.

19. The duct as set forth in claim 18 wherein the width of the duct at least doubles from the lower portion to the upper portion, and wherein cross sectional area of the duct remains generally constant from the lower portion to the upper portion.

20. The duct as set forth in claim 18 wherein the panels, as viewed from a direction transverse to the forward direction, are S-shaped.

21. The duct as set forth in claim 18 wherein the front and rear panels are generally identical.

\* \* \* \* \*